(12) United States Patent
Miura

(10) Patent No.: US 6,509,901 B1
(45) Date of Patent: Jan. 21, 2003

(54) IMAGE GENERATING APPARATUS AND A METHOD THEREOF

(75) Inventor: Katsuhiro Miura, Tokyo (JP)

(73) Assignee: Namco Limited, Tokyo (JP)

( * ) Notice: Subject to any disclaimer, the term of this patent is extended or adjusted under 35 U.S.C. 154(b) by 0 days.

(21) Appl. No.: 09/369,868

(22) Filed: Aug. 9, 1999

(30) Foreign Application Priority Data

Aug. 10, 1998 (JP) .......................................... 10-226170

(51) Int. Cl.[7] .............................................. G06F 12/06
(52) U.S. Cl. ...................................... 345/573; 345/554
(58) Field of Search ................................. 345/572, 564, 345/531, 545, 554, 534, 501, 536, 573; 348/94, 714–718; 358/1.6–1.8

(56) References Cited

U.S. PATENT DOCUMENTS

| | | | | |
|---|---|---|---|---|
| 5,500,654 A | * | 3/1996 | Fujimoto | 345/634 |
| 5,610,630 A | * | 3/1997 | Nakamura et al. | 345/539 |
| 5,719,953 A | * | 2/1998 | Okabayashi et al. | 348/94 |
| 6,034,785 A | * | 3/2000 | Itoh | 358/1.18 |

* cited by examiner

Primary Examiner—Kee M. Tung
(74) Attorney, Agent, or Firm—Fitch, Even, Tabin, & Flannery

(57) ABSTRACT

An image generating apparatus which includes a frame buffer having a drawing port and a display port for display and including a drawing area containing a graphic image data and a base picture area containing a base picture data, and a graphics drawing circuit, wherein the graphics drawing circuit generates a read address for reading reference data during a blanking period of a video signal, the reference background data is read out from the drawing area in the frame buffer, and the reference base picture data is read from the base picture area in the same buffer, both of which are outputted from the display port during the above blanking period are then transferred to the graphics drawing circuit which uses the above reference data for processing in translucent graphics drawing process.

9 Claims, 3 Drawing Sheets

IMAGE GENERATING APPARATUS AND A METHOD THEREOF

This application is based on Patent Application No. 226,170/1998 filed on Aug. 10, 1998 in Japan, the content of which is incorporated hereinto by reference.

FIELD OF THE INVENTION

The present invention relates to an image generating apparatus and an image generating method, and more particularly to an apparatus and a method thereof for generating a graphic image that includes a frame buffer having a drawing port and a display port for a display device or like.

DESCRIPTION OF THE PRIOR ART

In the prior art, a frame buffer comprising both of a drawing port and a display port as shown in FIG. 2 has been provided as the frame buffer for generating a graphic image or for composing a graphic image, which is used in a computer graphics apparatus, such as a three-dimensional (3-D) game machine, 3-D simulator and the like.

In FIG. 2, reference numeral 110 designates a graphics drawing circuit, and 120 designates a frame buffer. A parameters showing translucency etc. is usually stored in a texture memory (not shown) in the graphics drawing circuit 110. The frame buffer 120 has a drawing port 121 and a display port 122 for a display device, and comprises a drawing area 123 for drawing, a display area 124 for display, and a base picture area 125 in which a base picture, text mapping, and the like are stored. A video signal read out from the display area 124 through the display port 122, is sent through a digital-to-analog (D/A) converter circuit 131 and a video output circuit 130 to a display device 140 for display.

In the conventional frame buffer as described above, a graphic image is written into the graphics drawing area through the drawing port 121, and a background image and base picture are referred to (read out) through the drawing port when a translucent graphic image is drawn. The display port 122 is a read-only output port through which an image is outputted to synchronize with a display on the screen. Therefore, the display port is not be utilized during the blanking period. Specifically, since the data is outputted actually during every screen (frame) period as shown in FIG. 3 that illustrates an operation of the display port, the display port 122 remains unutilized for 20% to 30% of the total of all screen periods.

Particularly, since the time period for generating an image per one screen is limited to a certain amount of the time when any two-dimensional (2-D) graphic image is to be generated. Thus, when the high-level graphics processing such as the translucent image processing occurs, it becomes more difficult to improve picture quality.

SUMMARY OF THE INVENTION

An object of the present invention is to provide an apparatus for and method of generating a graphic image which improves the access to any background or base picture data when it is referenced, by making an effective use of the display port during the blanking period of a vide signal, allows the drawing port to be used as a write-only port, thereby reducing any overhead that might occur when switching between reading and writing occurs and increases the speed of writing, and provides the higher image quality even when any high-level image generation such as the translucent graphics generation occurs for the 2-D graphics generation that occurs in realtime.

According to the present invention, the image generating apparatus may comprise a frame buffer having a drawing port and a display port for display device, and an address generating means for generating a read address for reading out reference data from the frame buffer during a blanking period of a video signal which is read from the frame buffer, wherein the reference data that has been read from the frame buffer by using the read address is outputted from through the display port during the blanking period.

According to the present invention, the apparatus may further comprise signal separating means for separating in response to a video synchronizing signal the data for reference data outputted from the display port and the video signal, and for transferring the reference data to graphics drawing means and the video signal to video output means.

According to the present invention, the frame buffer may be a dual buffer configured to include a drawing area for creating a graphic image and a display area for providing for displaying the created graphic image, and wherein the reference data includes drawing data that is currently being written into the drawing area.

According to the present invention, the frame buffer may include a base picture area in which a base picture and the like may previously be stored, the base picture providing a basis for creating a graphic image to be drawn and wherein the reference data may include such base picture or the like that may be read from the base picture area.

According to the present invention, the reference data may be data that is used for processing in drawing a translucent image.

According to the present invention, the drawing port may be used as a write-only port.

According to the present invention, an image generating method of an image generating apparatus including a frame buffer having a drawing port and a display port is provided, which may comprise the steps of generating a read address for reading reference data from the frame buffer during a blanking period of a video signal when the video signal is read from the frame buffer, and outputting the reference data read out from the frame buffer by using the read address, through the display port during the above blanking period.

According to the present invention, the display port, which was not utilized during the blanking period according to the prior art, may now be used as a read-only port so that it can be utilized efficiently for reading out the reference data. This allows for more references or accesses to the background, base pictures and like in the frame buffer. The graphic drawing port may be used as the write-only port. As those ports are dedicated as the read-only port or the read-only port, respectively, any overhead that might occur if each of the ports is switched between reading and writing may be reduced or eliminated, and the speed of reading and writing through the ports, respectively, may be increased accordingly. In particular, when any 2-D graphic image is to be generated in real-time, it is advantageously possible to provide a higher image quality when any high-level image generation such as the translucent graphics generation occurs.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
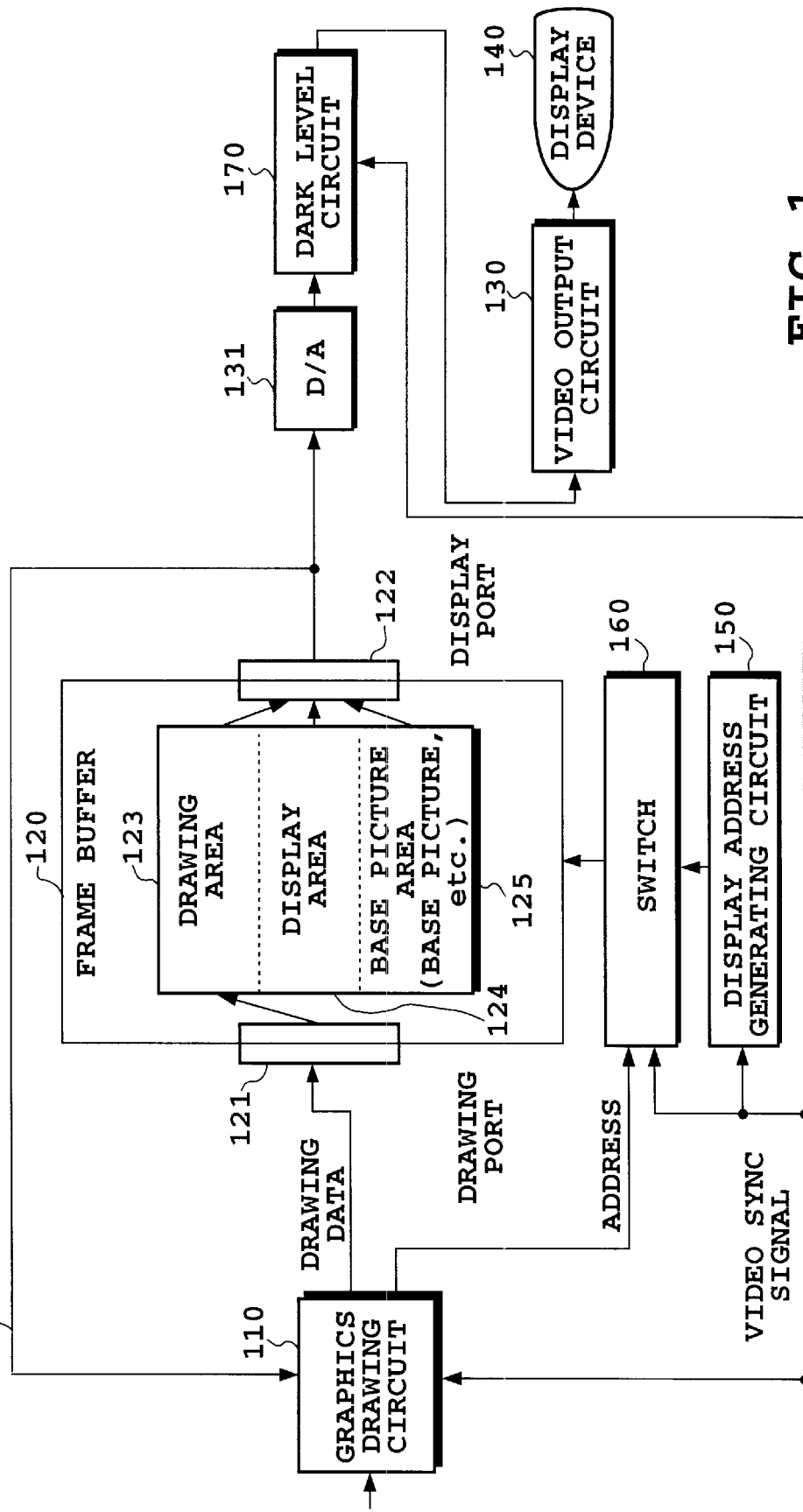
FIG. 1 is a block diagram illustrating an example of the configuration of the image generating apparatus according to one embodiment of the present invention.

One particular embodiment of the present invention is now described in detail by referring to the drawings.

Figure 2:
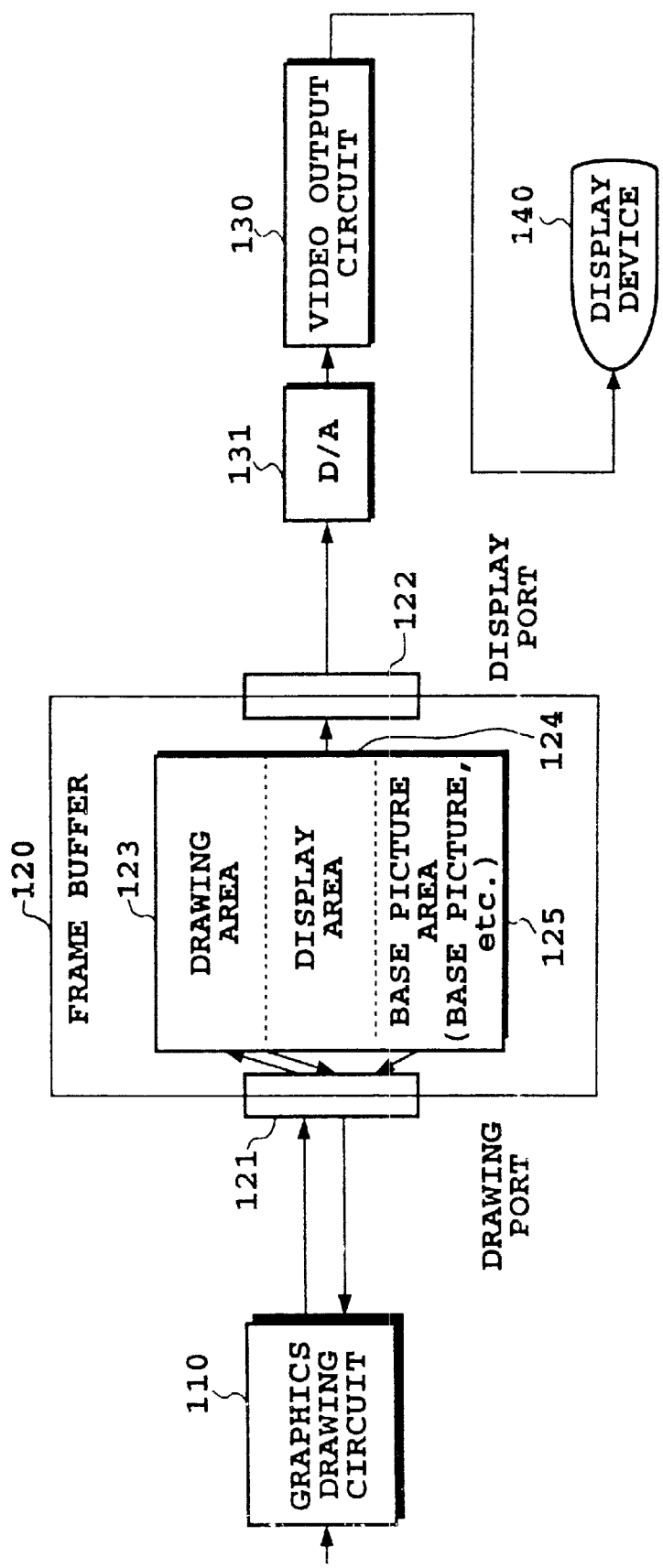
FIG. 2 is a block diagram illustrating an example of the configuration of the image generating apparatus in the prior art.

FIG. 1 shows an example of the configuration of the image generating apparatus according to one embodiment of the present invention. In FIG. 1, reference numeral 150 designates a display address generating circuit for generating a display address that is used to read an appropriate video image from a display area 124 in a frame buffer 120 in response to a video synchronizing (sync) signal. Reference numeral 160 designates a switch that is actuated in response to a video synchronizing signal during its blanking period (particularly, vertical blanking period) for switching between a read address outputted from the above display address generating circuit 150 and an address that is outputted by a graphics drawing circuit 110, the output of the switch 160 being supplied to the frame buffer 120. Reference numeral 170 designates a dark level circuit 170 which receives a video signal through D/A (digital to analog) converter circuit 131 from the display port 122 and the data such as background reference and base picture reference only outputted during the blanking period of the video signal through the D/A converter circuit 131, and extracts the video signal only, the extracted analog video signal being passed to the video output circuit 130. Specifically, the dark level circuit 170 may only extract the video signal by fixing in the blanking period (particularly, vertical blanking period) of the video sync signal, the dark data (that is, R, G, B signals represent zero, respectively). Any DRAM (dynamic RAM) can be used as the frame buffer 120. Those circuit components which are contained in the graphics drawing circuit 110 are essentially similar to those in the prior art graphics drawing circuit. Other circuit components are also similar to those in the prior art circuit example shown in FIG. 2, and therefore no further description will be provided in order to avoid the confusion.

Figure 3:
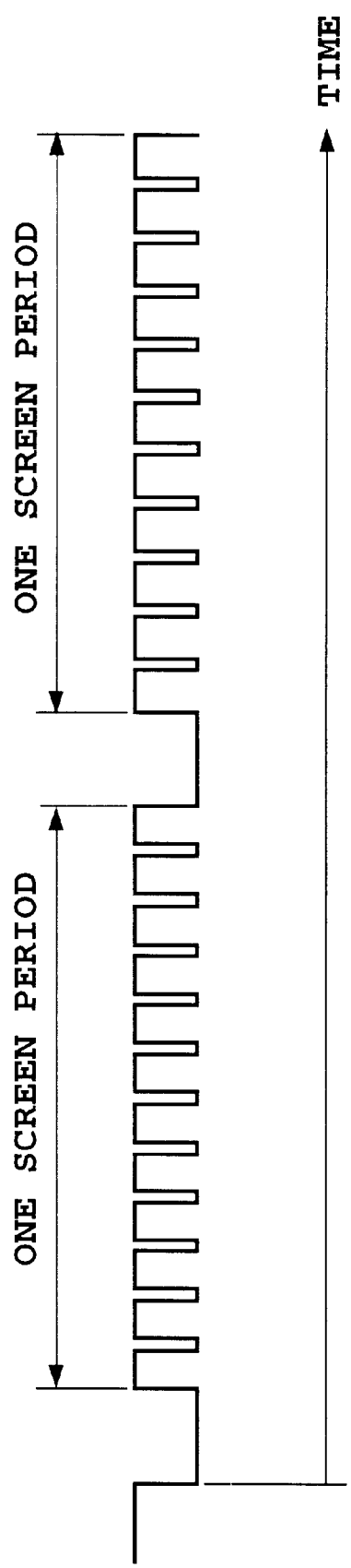
FIG. 3 is a schematic waveform diagram of one screen period and the blanking period of the video signal.

The operation of the circuit arrangement described above is now described. During every one screen period as shown in FIG. 3, the display address generating circuit 150 outputs a display address for one screen (one frame), to the frame buffer 120, and a video signal read out from the display area 124 in the frame buffer is sent through the display port 122. This video signal outputted from the display port 122 is then passed through the above dark level circuit 170 and then through the video output circuit 130 to a display device 140 and is displayed as a motion picture or a still picture. During one particular screen period as shown in FIG. 3, drawing data is outputted from the graphics drawing circuit 110. This drawing data is sent through the drawing port 121 on the frame buffer 120 to the graphics drawing area 123 in the frame buffer 120 and is drawn (written) in the graphics drawing area 123.

In the meantime, when a graphic object such as a translucent image is to be drawn, during the blanking period (particularly, vertical blanking period), the graphics drawing circuit 110 provides a read address for referring to the particular background, base picture and the like. This read address is sent to the frame buffer 120 through the switch 160. By this way, the reference background data is read out through the display port 122 from the drawing area 123, and the reference base picture data is read out through the display port 122 from the display area 125. Those reference data are inputted to the graphics drawing circuit 110 during the blanking period. Here, the term "background" should be understood to include any graphic image that is currently being written into the graphics drawing area 123.

The graphics drawing circuit 110 uses a predetermined algorism to obtain a particular translucent object such as polygon from the above reference background data and reference base picture data. The translucent polygon and its faces are identified by name, and when the visible curved faces are translucent, any two adjoining faces are primarily jointed and are stored in the frame buffer 120. Assuming that the colors of the background (the face just behind the visible face) derived from the background reference are Rbg, Gbp, and Bbp, and the colors of the translucent polygon (visible faces) derived from the base picture reference are Rp, Gp, and Bp, the brightness of the color information, i.e., R, G and B components, is expressed by the following equation (1), for example. Note that R, G and B in the equation indicate the brightness of the respective color components after the calculation about the translucent polygon. Since the equation for G and B are same as the equation for R, therefore the equations for G and B are not shown.

$$R = Rbg*\alpha + Rp*\beta \tag{1}$$

where, if the relation of $1 \geq \beta \geq 0$ and $\alpha = 1 - \beta$ are given, for example, the calculation is executed by only varying $\beta$ with $\alpha$ fixed, where $\beta$ represents the factor of translucency (also called the factor of transparency) for the translucent polygon having visible faces. If $\beta = 0$, the faces of the translucent polygon are not visible. If $\beta = 1$, those faces are translucent, and the background is not visible. If the background is also translucent, this algorism will be repeated recursively until any translucent side can be found, or until the background in its true sense of the word can be found. When the polygon is written into the drawing area 123 in the frame buffer 120 in the priority order of depth as performed by the so-called Newll-Newell-Snacha algorism, as in the present case, Rbg, Gbg and Bbg will match with values stored in the drawing area 123 in the frame buffer 120, and Rp, Gp and Bp will match with values of the current faces which are now written. The above calculation is executed on the pixel-to-pixel (picture element) basis.

A first method in which the above equation (1) is given is referred to as the blending (interpolating) operation (blending method), while a second method in which the equation (2) below is given is referred to as the filtering operation (filtering method), which is used to obtain a translucent polygon. Again, the equation (2) for R may also apply to G and B, therefore the equations for G and B are not shown. The calculation is also executed on the pixel-to-pixel (picture element) basis.

$$R = Rbg*\alpha' \tag{2}$$

where, $\alpha'$ is a factor of translucency (also called the factor of transparency) in the filtering method.

In addition, it is possible to use a third method which uses summing method shown by the equation below. Again, the equation (3) for R may also apply to G and B, therefore the equations for G and B are not shown. This operation may also be performed on the pixel-to-pixel (picture element) basis.

$$R = Rbg + \alpha''*Rplus \tag{3}$$

where, α' is a factor of translucency (also called the factor of transparency) in the summing method. Rplus is a summed value of color information.

Any of the above three methods is useful and the suitable method should be selected. In some cases, two or more of the methods may be combined to provide the high-level translucent image representations.

When the drawing operations in the drawing area 123 as described above, are completed, the resulting image is transferred to the display area 124 and is displayed in the display device 140 as described above, while the subsequent drawing operations for a next display screen may begin at the same time. Note that other output devices such as printer, image storage device and the like (not shown) may be used together with the display device 140 or instead of the display device 140.

As described above, according to the preferable embodiment, the display port 122, which was not utilized during the blanking period in the prior art, is used as the read-only port for the reference data and the drawing port 121 is used as the write-only port. Thus, those two ports can be utilized effectively. Accordingly, accesses to the frame buffer for reading and writing can be increased. Particularly, the drawing port used as the write-only port can reduce or eliminate any overhead that might be caused by switching between reading and writing. As each of the ports is dedicated as the read-only or write-only port, its speed can be increased. Particularly, for the high-level image generation, such as the translucent image generation, that occurs in realtime, two-dimensional (2-D) image generation, a high image (picture) quality may be produced.

The following presents other possible embodiments.

Specifically, the present invention may be applied to a single independent unit (such as a computer game machine), or may be applied to a system configured to include several units (such as a host computer, interface device, reader, printer, and the like).

Note, furthermore, that in order to achieve the object of the present invention, the functions described above in connection with the preferred embodiment may be implemented by software program code that may be written on any recording medium (storage medium), such software program code in the recording medium may be installed on the system or independent unit, and the system or unit may be made to read the program code and execute it. In this case, it should be understood that the program code itself that implements the functions, as well as the recording medium containing such program code, will fall within the scope of the present invention.

The present invention has been described in detail with respect to preferred embodiments, and it will now be more apparent from the foregoing to those skilled in the art that changes and modifications may be made without departing from the invention in its broader aspect, and it is the invention, therefore, in the appended claims to cover all such changes and modifications as fall within the true spirit of the invention.

What is claimed is:

1. An image generating apparatus having a frame buffer, including:
    a reference data area for storing reference data,
    a drawing area for generating a video signal to be displayed,
    a display area for storing a generated video signal,
    a drawing port for writing data to be stored, and
    a display port for reading out a stored data, wherein by using said reference data stored in said reference data area, said video signal is generated in said drawing area, the generated video signal is copied to said display area and the video signal stored in said display area is read out for displaying through said display port, the apparatus comprising:
    a first address generating means for generating a first read address for reading out said generated video signal from said display area in said frame buffer, during a display period; and
    a second address generating means for generating a second read address for reading out said reference data from said reference data area, during a blanking period,
    wherein the video signal to be displayed is outputted from said frame buffer through said display port by said first read address, and the reference data is outputted from said frame buffer through said display port by said second read address.

2. The image generating apparatus as claimed in claim 1, further comprising signal separating means for separating in response to a video synchronizing signal said data for reference data outputted from said display port and said video signal, and for transferring said reference data to graphics drawing means and said video signal to video output means.

3. The image generating apparatus as claimed in claim 1, wherein said reference data is data that is used for processing in drawing a translucent image.

4. The image generating apparatus as claimed in claim 1, wherein said graphics drawing port is used as a write-only port.

5. An image generating method of an image generating apparatus having a frame buffer including a reference data area for storing reference data, a drawing area for generating a video signal to be displayed, a display area for storing the generated video signal, a drawing port for writing data to be stored and a display port for reading out the stored data, wherein by using reference data in said reference data area, the video signal is generated in said drawing area, the generated video signal is copies to said display area and the video signal on said display area is read out for displaying through said display port, comprising:
    generating a first read address for reading out said generated video signal from said display area in said frame buffer, during a display period; and
    generating a second read address for reading out said reference data from said reference data area, during a blanking period,
    wherein the video signal to be displayed is outputted from said frame buffer through said display port by said first read address and the reference data is outputted from said frame buffer through said display port by said second read address.

6. The image generating method as claimed in claim 5, further comprising the step of:
    separating said reference data outputted from said display port and said video signal in response to a video synchronizing signal and transferred said reference data to graphics drawing means and said video signal to video output means.

7. The image generating method as claimed in claim 5, wherein said reference data is data that is used for processing in drawing a translucent image.

8. The image generating method as claimed in claim 5, wherein said drawing port is used as a write-only port.

9. An image generating method comprising steps of:
    providing reference data through a drawing port;

storing reference data in a reference data area of a frame buffer, generating a video signal in a drawing area of the frame buffer using the reference data, storing the generated video signal in a display area of the frame buffer, during a display period, generating a first read address for reading out said generated video signal from said display area;

during a blanking period, generating a second read address for reading out said reference data from said reference data area, and displaying the video signal through said display port by said first read address and the reference data through said display port by said second read address.

* * * * *